(12) United States Patent  (10) Patent No.: US 8,690,229 B2
Ishikawa  (45) Date of Patent: Apr. 8, 2014

(54) COWL TOP COVER AND METHOD OF MANUFACTURING THE SAME

(71) Applicant: Nihon Plast Co., Ltd., Shizuoka (JP)

(72) Inventor: Koji Ishikawa, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 13/659,664

(22) Filed: Oct. 24, 2012

(65) Prior Publication Data

US 2013/0106140 A1  May 2, 2013

(30) Foreign Application Priority Data

Oct. 26, 2011  (JP) ................. 2011-235075

(51) Int. Cl.
*B62D 25/08* (2006.01)
(52) U.S. Cl.
USPC ........................................................ 296/192
(58) Field of Classification Search
USPC ........................................................ 296/192
See application file for complete search history.

(56) References Cited

U.S. PATENT DOCUMENTS

| 7,316,447 B2* | 1/2008 | Kelly ............................ 296/192 |
| 2003/0218272 A1 | 11/2003 | Sekito et al. |
| 2006/0188603 A1 | 8/2006 | Sekito et al. |
| 2006/0226681 A1* | 10/2006 | Kelly ............................ 296/192 |
| 2008/0093891 A1 | 4/2008 | Benvenuto et al. |
| 2009/0058139 A1* | 3/2009 | Izawa ............................ 296/192 |

FOREIGN PATENT DOCUMENTS

JP  2003-285350 A  10/2003

OTHER PUBLICATIONS

Office Action dated Feb. 14, 2013, issued in corresponding GB Patent Application No. 1219187.0.

* cited by examiner

*Primary Examiner* — Lori Lyjak (74) *Attorney, Agent, or Firm* — Arent Fox LLP (57) ABSTRACT

The invention provides a method of manufacturing a cowl top cover, which can easily adjust a reaction force of a first seal portion, and ensure sealing performance in a lip part. A main body cavity is formed in a part of a cavity by moving a slid core forward in a guide hole and making it contact with a second die. A cover main body is molded by injecting a synthetic resin into the main body cavity. A slide core is moved backward by a predetermined distance in the guide hole so that the thickness of a lip part in a lip protrusion becomes smaller than that of the lip part in a second seal portion. The lip part is molded by injecting a synthetic resin softer than that forming the cover main body into a seal portion cavity.

4 Claims, 7 Drawing Sheets

COWL TOP COVER AND METHOD OF MANUFACTURING THE SAME

CROSS REFERENCE TO RELATED APPLICATIONS

This application claims priority of Japanese Patent Application No. 2011-235075 filed on Oct. 26, 2011. The contents of this application are incorporated herein by reference in their entirety.

BACKGROUND OF THE INVENTION

1. Field of the Invention

The present invention relates to a cowl top cover made of synthetic resign, which comprises a cover main body covering a cowl, and a lip part pressed to contact a window shield, and a method of manufacturing the cowl top cover.

2. Description of the Related Art

Conventionally, there has been used a cowl top cover as a cowl cover, which is placed in a so-called cowl between a front end of a window shield, i.e., a front glass of an automobile and a rear side of a front hood, and covers the cowl to improve the appearance. Such a cowl top cover comprises a plate-like cover main body made of hard synthetic resin and fixed to a vehicle body panel to cover a cowl, and a lip part having a plurality of first and second, for example, seal portions made of synthetic resin softer than that of the cover main body and pressed to contact a front glass to prevent ingress of water, foreign matters, or the like. The cover main body and lip part are molded as one unit.

For easily forming a lip-shaped seal portion in a lip part of such a cowl top cover, there is a known method, which comprises a first process of molding a cover main body by injecting hard synthetic resin into one cover main body forming cavity formed as a cavity partitioned by moving a slide core as a slide piece forward in a cavity between first and second dies, and a second process of forming a lip part having two seal portions as one piece by injecting soft synthetic resin into the other cover main body forming cavity in the cavity by moving the slide core backward (e.g., see Japanese Unexamined Patent Application Publication No. 2003-285350). A die used in this method is so constructed that a first seal portion molding part is formed contiguously to an outside end of a lip part forming cavity, a recess is formed in one side of a slide core, so that when the slide core is moved backward, a second seal portion molding part contiguous to the lip part forming cavity at a proximal end of the first seal portion molding part is formed as a portion parted from the inside of the second die, and soft synthetic resin is filled in the first and second seal portion molding parts in a second process.

However, in the above method, the second seal portion is formed in the recess formed in a recess shape inside the slide core. Thus, in the case where a reaction force of the first seal portion against the front glass is adjusted considering mountability of the cowl top cover, when making fine adjustments of the thickness of the proximal end side of the first seal portion according to positions of the slide core, the shape of the second seal portion follows the adjustments, and it becomes uneasy to ensure a pressing force of the second seal portion to the glass face.

Further, when the cowl top cover is mounted on a vehicle body, the second seal portion is pressed to contact the front glass and crushed and deformed, thereby causing a minute gap between the front glass and cover main body, and it is uneasy to set the shape of the second seal portion so as not to generate noises caused by the cowl top cover contacting the front glass due to vibrations when an automobile is running.

The present invention has been made in order to solve the above problems. Accordingly, it is a object of the present invention to provide a method of manufacturing a cowl top cover, which can easily adjust a reaction force of a first seal portion and ensure sealing performance in a lip part. It is another object of the invention to provide a cowl top cover, which prevents noises caused by contacting a window shield.

SUMMARY OF THE INVENTION

A first aspect of the present invention is a method of manufacturing a cowl top cover, in which the cowl top cover is made of synthetic resin, comprising a cover main body which covers a cowl between a window shield and a vehicle body member, and a lip part which is adjacent to the cover main body and is softer than the cover main body, the cover main body has a main body protrusion which is formed so as to be protruded on a backside at a position adjacent to the lip part and is opposed to the window shield, the lip part has a lip main body whose proximal end is adjacent to the main body protrusion, a first seal portion which is formed so as to be protruded at a distal end of the lip main body and is pressed to contact the window shield, a second seal portion which is formed at a proximal end of the first seal portion to be protruded to the window shield and is pressed to contact the window shield, and a lip protrusion which is formed to be protruded at the backside of the lip main body in an area adjacent to the main body protrusion of the lip main body and is opposed to the window shield, and the method comprises a main body molding process, which uses a molding die including a first die having a first recess forming the main body protrusion, a second recess forming the second seal portion, and a guide hole placed between the first and second recesses, a second die which forms a cavity connecting the first and second recesses to the guide hole in a space to the first die, and a slide piece having at a side of the cavity, a slide piece recess forming the lip protrusion and placed movable forward and backward in the guide hole of the first die; moves the slide piece forward in the guide hole to make it contact with the second die; and molds the cover main body by injecting a synthetic resin into a main body cavity formed in a part of the cavity, and a lip part molding process, which moves the slide piece backward by a predetermined distance in the guide hole so that a thickness of the lip part in the lip protrusion becomes smaller than that of the lip part in the second seal portion; and molds the lip part by injecting a synthetic resin softer than the synthetic resin into a remaining part of the cavity.

In a method of manufacturing a cowl top cover according to a second aspect of the present invention, in the lip part molding process, the predetermined distance to move the slide piece backward in the guide hole is set so that the thickness of the lip part in the lip protrusion is smaller than the thickness of the lip part in the second seal portion and a thickness of the cover main body in the main body protrusion.

A cowl top cover according to a third aspect of the present invention, a cover main body which covers a cowl between a window shield and a vehicle body member; and a lip part which is adjacent to the cover main body and is softer than the cover main body. The lip part includes: a lip main body whose proximal end is adjacent to the cover main body; a first seal portion which is formed so as to be protruded at a distal end of the lip main boy, and is pressed to contact the window shield;

and a second seal portion which is formed so as to be protruded to the window shield at a proximal end of the first seal portion, and is pressed to contact the window shield, and the cover main body has a main body protrusion which is formed so as to be protruded to a backside at a position adjacent to the lip main body, and is opposed to the window shield.

In a cowl top cover according to a fourth aspect of the present invention, the lip part has a lip protrusion which is formed so as to be protruded to the backside in an area adjacent to the main body protrusion of the lip main body, and is opposed to the window shield, and the main body protrusion is extended to the backside to be lower than the lip protrusion.

In the method of manufacturing a cowl top cover according to the first aspect of the invention, the slide piece is moved forward in the guide hole until contacting the second die, the cover main body is molded by injecting the synthetic resin into the main body cavity formed in a part of the cavity, the slide piece is moved backward by a predetermined distance in the guide hole so that the thickness of the lip part in the lip protrusion becomes smaller than that of the lip part in the second seal portion, and the lip part is molded by injecting the synthetic resin softer than the synthetic resin forming a cover main body into the remaining area of the cavity, whereby a reaction force of the first seal portion can be easily adjusted simply by adjusting the thickness of the lip main body by adjusting a predetermined distance to move the slide piece backward in the guide hole, and as the shapes of first and second seal portions are not influenced by a moving distance of the slide piece, sealing performance in the lip part is ensured. Further, the main body protrusion prevents a gap between the cover main body and the window shield. This prevents a deflection stroke toward the window shield when an impact is given to the cowl top cover, and a noise caused by contacting the window shield.

In the method of manufacturing a cowl top cover according to the second aspect of the invention, in addition to the effect of the method of manufacturing the cowl top cover according to the first aspect, a predetermined distance to move the slide piece backward in the guide hole is set so that the thickness of the lip part in the lip protrusion becomes smaller than the thickness of the lip part in the second seal portion and the thickness of the cover main body in the main body protrusion, whereby the main body protrusion is protected by the lip protrusion softer than the main body protrusion when the cowl top cover is mounted, and damage to the window shield by the main body protrusion can be prevented. As the main body protrusion can be extended to the backside to be lower than the lip protrusion, the main body protrusion can be prevented from butting against the upper surface of the window shield even if the cowl top cover deflects to the window shield when an impact is given.

In the cowl top cover according to the third aspect of the invention, the main body protrusion is formed so as to be protruded opposite to the window shield on the backside of the cover main body at a position adjacent to the lip main body of the lip part having the first and second seal portions pressed to contact the upper surface of the window shield, thereby preventing a gap between the cover main body and the window shield by means of the main body protrusion. This prevents the deflection stroke toward the window shield when an impact is given to the cowl top cover, and a noise caused by contacting the window shield.

In the cowl top cover according to the fourth aspect of the invention, in addition to the effect of the cowl top cover according to the third aspect, the lip protrusion is formed to be protruded on the backside of the lip part at in an area adjacent to the main body protrusion of the lip main body, whereby the main body protrusion is protected by the lip protrusion softer than the main body protrusion when the cowl top cover is mounted, and damage to the window shield by the main body protrusion can be prevented. Further, as the main body protrusion is extended to the backside to be lower than the lip protrusion, the main body protrusion can be prevented from butting against the surface of the window shield even if the cowl top cover deflects to the window shield when an impact is given.

DESCRIPTION OF THE PREFERRED EMBODIMENTS

Hereinafter, preferred embodiments of a cowl top cover and a method of manufacturing the same according to the present invention will be described with reference to the accompanying drawings.

Figure 3:
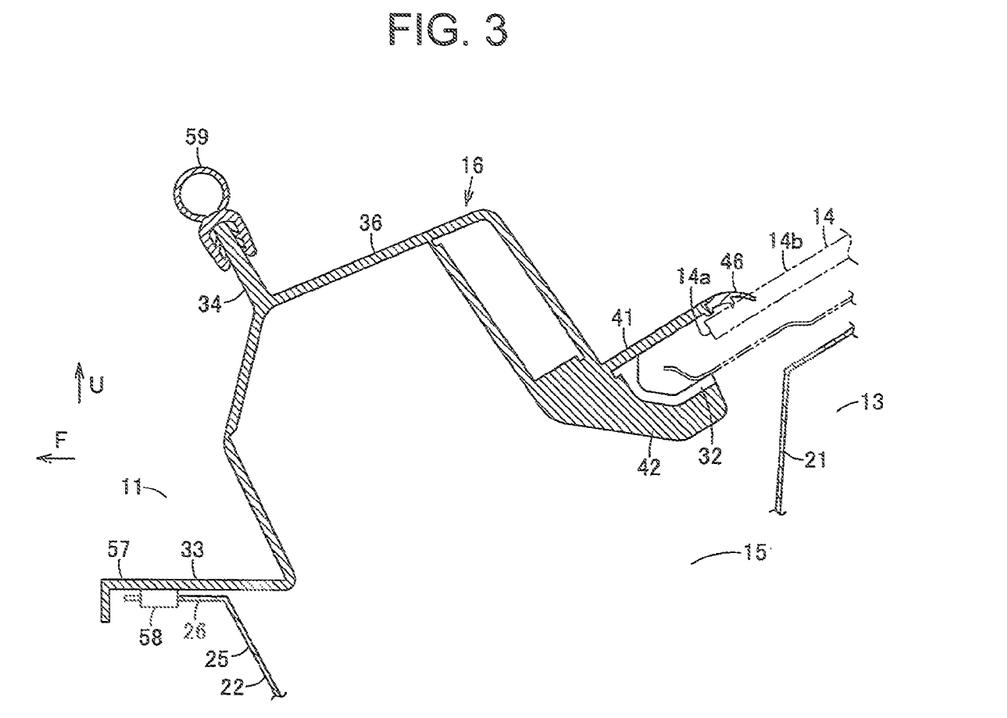
FIG. 3 is a sectional view of the cowl top cover taken along the line I-I of FIG. 5.
Figure 4:
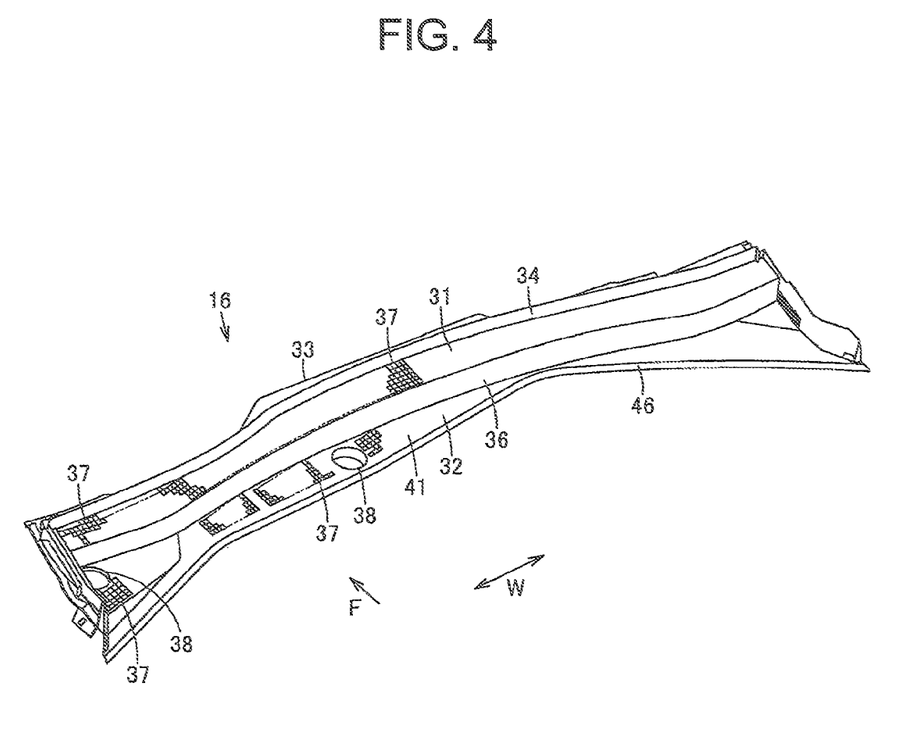
FIG. 4 is a perspective view of the cowl top cover.
Figure 5:
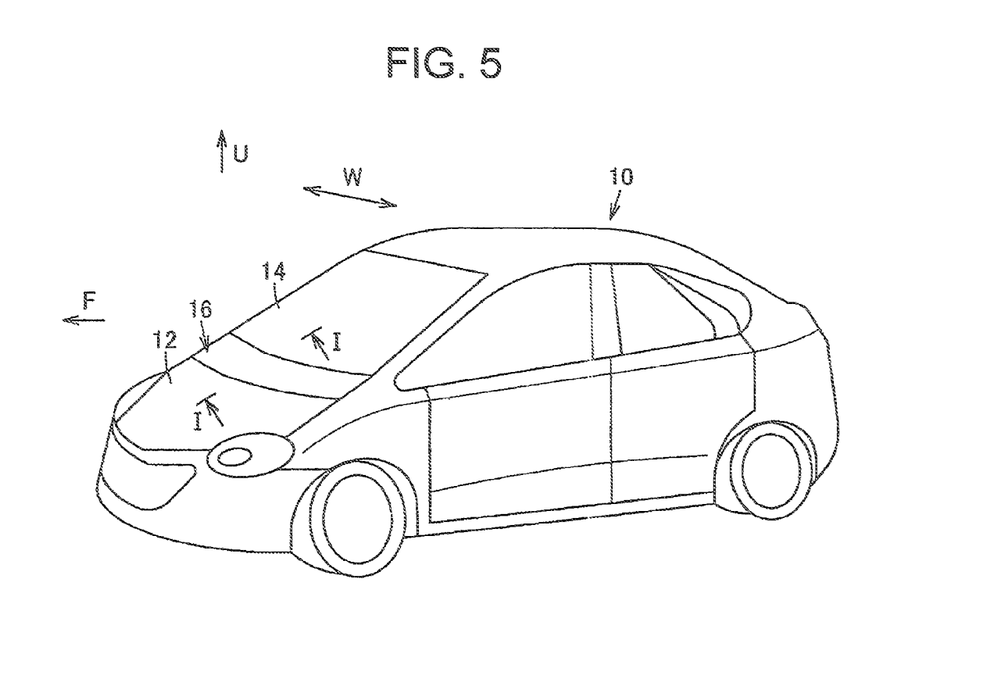
FIG. 5 is a perspective view of a vehicle on which the cowl top cover is mounted.

In FIGS. 3 and 5, a reference numeral 10 denotes a vehicle body of an automobile as a vehicle. On the vehicle body 10, a cowl top cover 16 is mounted, covering a cowl 15 between a hood 12 as a mating member covering an engine room 11 and a front glass 14 as a window shield placed on the front side of a vehicle chamber 13. Hereinafter, directions such as longitudinal, vertical, and widthwise will be explained with reference to a forward direction of the vehicle body 10, and an arrow F indicates a forward direction, an arrow U indicates an upward direction, and an arrow W indicates a widthwise direction.

The cowl 15 is also called an air box, which is shaped like a conduit whose upper side is opened with a cowl top panel 21 made of iron plate, for example, and a vehicle body panel 22 made of iron plate, for example, as a vehicle body member constituting a vehicle body. On the upper side of the cowl top panel 21, the front glass 14 is fixed to the cowl top panel 21 with a not-shown sealing material such as a rubber-based liquid-tight adhesive like a hot-melt. The vehicle body panel 22 is also called an extension panel, whose rear side forms a not-shown base plate fixed to the cowl top panel 21, which is provided with a front plate part 25 formed by raising the front side part of the base plate forward and upward, and a support plate 26 formed by extending the upper end of the front plate part 25 substantially horizontally. The cowl 15 is connected with an air intake of a not-shown air conditioner for taking outside air into the vehicle chamber 13. On the right side as one side of the cowl 15, a motor for driving a per arm of a not-shown wiper is provided.

The hood 12 is a openable front hood, which is located in the front part of the vehicle 10, and covers the engine room 11, and is composed of a hood outer part located outside, that is, on the upper side when closed and a hood inner part located inside the hood outer part, that is, on the lower side via some space when closed, which are formed as one piece or separate pieces.

Figure 2:
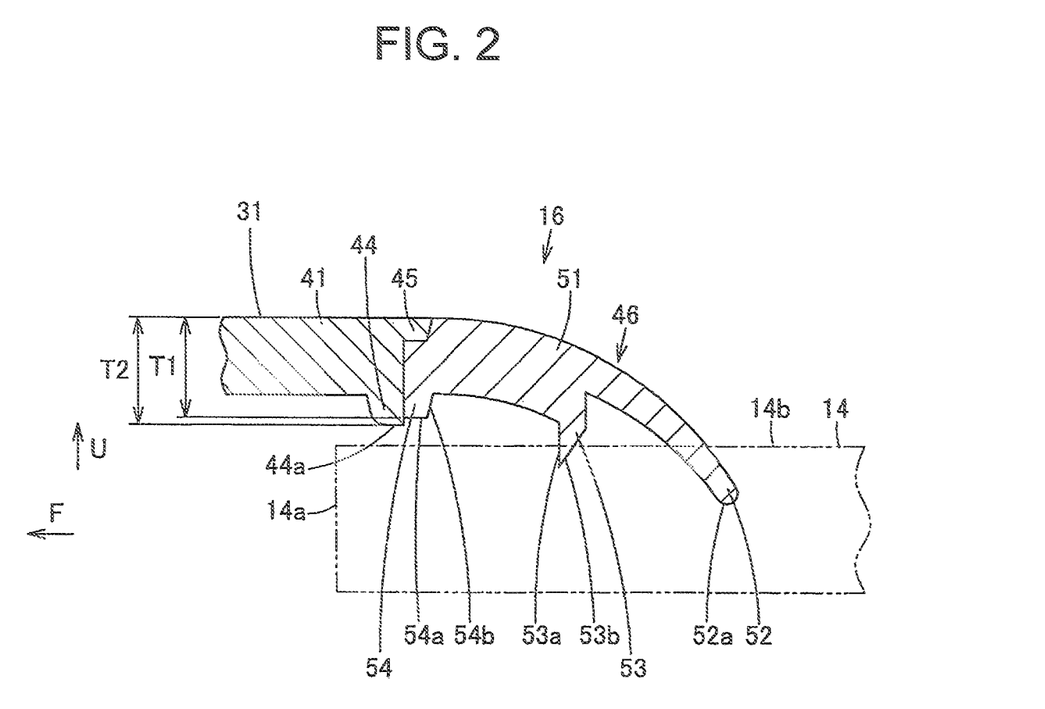
FIG. 2 is a sectional view magnifying a part of the cowl top cover.
Figure 7:
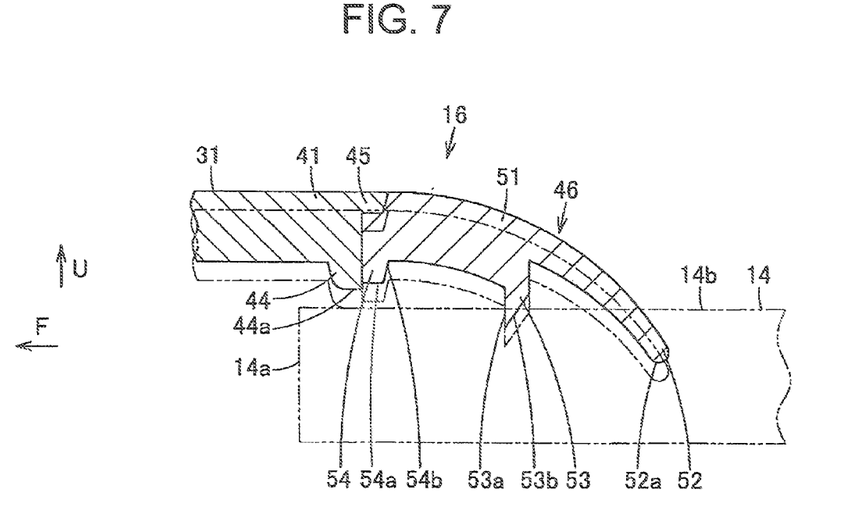
FIG. 7 is a sectional view magnifying a state where an impact is given to the cowl top cover.

As shown in FIGS. 2 and 7, the cowl top cover 16 covers the cowl 15 between an edge 14a at the front lower end of the front glass 14 and a rear end of the engine room 11 located in front of the front glass 14. The cowl top cover is also called a cowl cover, which is formed in a long substantially plate shape along the cowl 15 in the widthwise direction W of the vehicle body 10, i.e., in the vehicle width direction, to cover the upper side of the cowl 15, that is, the cowl top panel 21 and vehicle body panel 22, in order to improve the appearance. Further, the cowl top cover 16 is formed as an integrally formed rectangular resin mold piece by injection molding a thermoplastic synthetic resin, for example. The cowl top cover 16 has a planar shape whose central area is gently curved to be protruded to the front side.

The cowl top cover 16 basically comprises, in the shape of a cross section, a cover main body 31 covering the cowl 15, a fitting part 32 as a wind shield fixing part provided at the rear end of the cover main body 31, a vehicle body member fixing part 33 which is located on the front side of the cover main body 31 and supported by the support plate 26, and a seal fixing part 34 which is located on the front side of the cover main body 31 and protruded opposite to the rear lower side of the hood 12.

The cover main body 31 is appropriately shaped according to the shapes of the engine room 11 and hood 12 or the wiper layout, but in the embodiment, a curved part 36 is formed by curving a central area of a plate-like member in a longitudinal direction assuming a vehicle width direction to be a longitudinal direction. Further, the cover main body 31 is formed by injection molding a hard thermoplastic synthetic resin. An air intake 37 shaped in, for example, a grid form, capable of taking outside air into the cowl 15 is formed in an area from the center of the cover main body 31 to one side except the curved part 36, and a not-shown reinforcement rib is formed on the rear side. Further, an opening 38 to penetrate a wiper axis is formed in the cover main body 31.

The fitting part 32 can be called a glass fitting part, and comprises a plate-like upper fit piece 41 formed by extending the rear end of the cover main body 31 on the same plane, and a lower fit piece 42 placed along the rear side, i.e., lower side of the upper fit piece 41. The fitting part 32 is so constructed that the edge 14a of the front glass 14 is inserted into the clearance between the upper fit piece 41 and lower fit piece 42, and the cowl top cover 16 is pushed rearward, i.e., in a predetermined direction, whereby the upper and lower fit pieces 41 and 42 elastically hold the front glass 14 together with the cowl top panel 21, and fit the cowl top panel to the edge 14a of the front glass 14.

In the lower part of the rear end of the upper fit piece 41, a main body protrusion 44 is formed so as to be protruded toward the lower side as the rear side. In the upper part of the rear end of the upper fit piece 41 above the main body protrusion 44, a rear protrusion 45 is formed so as to be protruded toward the rear side, and a lip part 46 is formed as one piece adjacent to the rear end of the main body protrusion 44, and is projected rearward.

The main body protrusion 44 controls a deflection stroke when an impact (an external force) is applied to the cowl top cover 16 in the vertical direction, and protrudes substantially perpendicular to the rear side (lower side) of the upper fit piece 41. In the state where the cowl top cover 16 is mounted on the vehicle body 10, a distal end 44a is opposed to an upper surface 14b that is the surface of the front glass 14 via a predetermined space. The rear protrusion 45 expands a bonding area between the cover main body 31 and lip part 46, protrudes along the protruding direction of the upper fit piece 41, and bites integrally into the lip part 46.

The lip part 46 is made of (elastic) synthetic resin softer than that forming the cover main body 31, extends long over the entire widthwise direction W of the upper fit piece 41, and is formed as one piece with the cover main body 31 by two-color molding. The lip part 46 has a lip main body 51 whose proximal end is adjacent to the main body protrusion 44, a first seal portion 52 protruding from the rear end of the lip main body 51, a second seal portion 53 protruding toward the front glass 14, i.e., downward, in the front side, i.e., proximal end side of the first seal portion 52, and a lip protrusion 54 formed so as to be protruded on the lower, i.e., the rear side in the area adjacent to the main body protrusion 44 of the lip main body 51 that is a proximal end of the first seal portion 52.

The lip main body 51 forms a proximal end of the first seal portion 52, and sets a reaction force of the first seal portion 52 by the thickness, and has the thickness substantially equal to that of the upper fit piece 41 of the cover main body 31, for example. In the lip main body 51, the upper side that is the front side is gradually curved rearward and downward.

The first seal portion 52 prevents ingress of water, foreign matters, or the like from the outside into the cows 15, and gradually curves rearward and downward like an arc along the curve of the hp main body 51. A distal end 52a of the first seal portion 52 is arc-shaped so that the distal end 52a makes a line contact with the upper surface 14b of the front glass 14. The distal end 52a of the first seal portion 52 protrudes down below the distal end 44a of the main body protrusion 44 and the distal end 53a of the second seal portion 53.

The second seal 53 prevents ingress of water, foreign matters, or the like from the outside into the cowl 15, and is located near the proximal end of the first seal portion 52 and apart behind the lip protrusion 54. A rear side of the second seal portion 53 forms a slope 53b inclined rearward and upward. Thus, the distal end 53a of the second seal portion 53 is gradually narrowed in the longitudinal direction, and is protruded downward from the distal end 44a of the main body protrusion 44.

The lip protrusion 54 is formed so as to be protruded downward as one piece with the main body protrusion 44 at the rear of the main body protrusion 44 of the upper fit piece 41 and at a position under the rear protrusion 45. In the state where the cowl top cover 16 is mounted on the vehicle body 10, a distal end 54a is faced to the upper surface 14b of the front glass 14 via a predetermined space. The thickness (plate thickness) T1 of the lip part 46 in the lip protrusion 54 is made smaller than the thickness (plate thickness) T2 of the cover main body 31 (the upper fit piece 41) in the main body protrusion 44 (T2≥T1). In the embodiment, the thickness T1 of the lip part in the lip protrusion 54 is smaller than the thickness (plate thickness) T2 of the cover main body 31 (the upper fit piece 41) in the main body protrusion 44. In other words, the distal end 44a of the main body protrusion 44 is extended to be lower than the distal end 54a of the lip protrusion 54. The thickness of the lip part 46 and cover main body 31 means the thickness in the direction orthogonal to the vehicle width and longitudinal direction, that is, the thickness in the vertical direction shown in FIG. 2. A rear side of the lip protrusion 54 forms a protrusion slope 54b inclined rearward and upward across the lip main body 51. The protrusion slope 54b prevents damage to the front glass 14 when the cowl top cover 16 is mounted, and is faced to the front side of the second seal portion 53. The lip protrusion 54 is formed in the same shape as that of the rear protrusion 45 of the cover main body 31.

The vehicle body member fixing part 33 can be called a vehicle body mounting part or a vehicle body fixing part, and is provided with a substantially horizontal plate-like vehicle body mounting plate 57 placed on the support plate 26. A plurality of not-shown mounting portions such as mounting holes formed at predetermined positions on the vehicle body mounting plate 57 is removably fixed to the support plate 26 of the vehicle body panel 22 by means of a not-shown mounting bracket such as a resin-made clip or bolt, or a hook shape molded as one piece with the fixing part. On the lower side of the vehicle body mounting plate 57, a sealing agent 58 called an epto-seal is fixed by, e.g., bonding to tightly contact the support plate 26 to shield heat and odor from the engine room 11.

The seal fixing part 34 can be called a hood seal fixing part. On the seal fixing part 34, a hood seal 59 is disposed by e.g., bonding or fitting from the upper side as an elastically deformable seal member. The hood seal 59 is made of rubber or thermoplastic elastomer in the shape of a cylinder, for example, and is liquid-tightly adhered to the closed hood 12 to shield heat and odor from the engine room 11.

Figure 1:
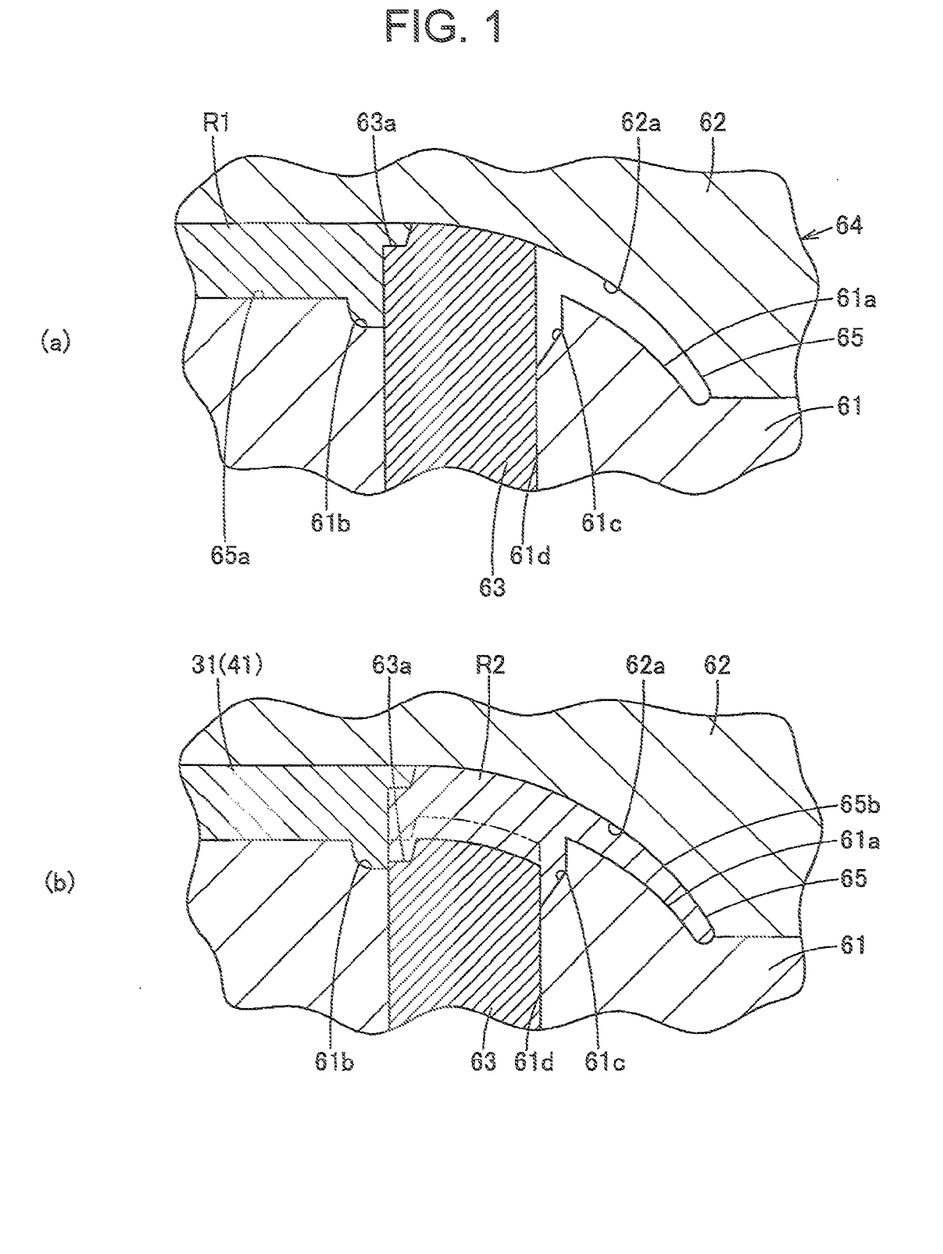
FIG. 1 is an explanatory cross section showing a method of manufacturing a cowl top cover according to an embodiment of the present invention, in which (a) shows a process of molding a cover main body, and (b) shows a process of molding a lip part.

The cowl top cover 16 is molded as one piece by means of a molding die 64 comprising a first die 61, a second die 62, and a slide core 63 as a slide piece shown in FIGS. 1(a) and (b).

The first die 61 called a core type is opposed to the second die 62, and has first and second recesses 61b and 61c on an upper first molding surface (a cavity surface) 61a forming a cavity 65. A guide hole 61d, in which the slide core 63 is placed slidably forward and backward, is formed along the vertical direction in connection to the first molding surface 61a.

The first recess 61b can be called a recess for a protrusion, and can form the main body protrusion 44 of the cover main body 31.

The second recess 61c can be called a recess for a seal, and can mold the second seal portion 53.

The first and second recesses 61b and 61c are formed in connection to the cavity 65.

The guide hole 61d is located between the first and second recesses 61b and 61c, and both sides are connected to the first and second recesses 61b and 61c.

The second die 62 called a cavity type is opposite to the first die 61, and has a second molding surface (a cavity surface) 62a, which forms a cavity 65 in a space to the first molding surface 61a of the first die 61, in the lower part opposite to the first die 61.

The slide core 63 is configured to move forward and rearward along the guide hole 61d by means of a not-shown driving mechanism such as a hydraulic mechanism or a link mechanism, for example. In the upper part of the slide core 63, a core recess 63a, which is a slide pierce recess forming a rear protrusion 45 and a lip protrusion 54, is formed on the same side as the first recess 61b.

When the cowl top cover 16 is manufactured, first, as shown in FIG. 1(a), the first and second dies 61 and 62 are matched (closed) to form the cavity 65, and the slide core 63 is moved forward to the second die 62 with respect to the cavity 65 until contacting the second molding surface 62a, thereby forming the main body cavity 65a. Molten resin material R1 is injected (poured) into the main body cavity 65a to fill it, and then the resin material R1 is solidified by cooling with a not-shown cooling mechanism, thereby molding the cover main body 31 (a main body molding process).

Then, as shown in FIG. 1(b), a seal portion cavity 65b is formed in the remaining area of the cavity 65, i.e., an area except the cover main body 31 by moving (retracting) the slide core 63 backward by a predetermined distance with respect to the second die 62 by means of a driving mechanism, the seal portion cavity 65b is filled by melting and injecting (pouring) a resin material R2 softer and more elastic than the resin material R1 that forms the cover main body 31, then the resin material R2 is solidified by cooling with a not-shown cooling mechanism, and the lip part 46 is molded as one piece with the cover main body 31 (a lip part molding process).

At this time, a predetermined distance to move (retreat) the slide core 63 in the guide hole 61d is set so that the thickness of the lip part 46 in the lip protrusion 54 is smaller than the thickness of the lip part 46 in the second seal portion 53 and the thickness of the cover main body 31 in the main body protrusion 44, in the direction of separating from the second die 62. As the predetermined distance is shorter, the thickness of the lip main body 51 is smaller, and a reaction force of the first seal portion 52 is set relatively small. In other words, the predetermined distance is set in response to a desired reaction force of the first seal portion 52. On the other hand, the first and second seal portions 52 and 53 are molded by the seal portion cavity 65b, and they are not influenced in terms of shape change by a moving distance of the slide core 63.

Thereafter, the first and second dies 61 and 62 are opened, and the cowl top cover 16 is removed (a die removing process), whereby the cowl top cover 16 is completed.

The cowl top cover 16 formed as described above is mounted on the vehicle body 10 by inserting and fitting the fitting part 32 at the rear end to the edge 14a of the front glass 14, pressing the lip part 46 so as to contact the upper surface 14b of the front glass 14, and placing the vehicle body member fixing part 33 at the front end on the support plate 26 and fixing it by using a fixing tool. In the state where the hood 12 is closed, the hood seal 59 supported by the seal fixing part 34 closely contacts the hood 12 to shield heat and odor from the engine room 11. The front and rear portions of the curved part 36 of the cover main body 31 function as a conduit to drain rainwater to both sides.

As described above, in the embodiment, the slide core 63 is moved forward in the guide hole 61d until contacting the second die 62, the cover main body 31 is molded by injecting a synthetic resin (resin material R1) into the main body cavity 65a formed in a part of the cavity 65, the slide core 63 is moved backward by a predetermined distance in the guide hole 61d so that the thickness of the lip part 46 in the lip protrusion 54 becomes smaller than that of the lip part 46 in the second seal portion 53, and the lip part 46 is molded by injecting a synthetic resin (resin material R2) softer than the synthetic resin (resin material R1) forming the cover main body 31 into the seal portion cavity 65d as the remaining area of the cavity 65, whereby a reaction force of the first seal portion 52 can be easily adjusted (finely-adjusted) simply by adjusting the thickness of the lip main body 51 by adjusting a predetermined distance to move the slide core 63 backward in the guide hole 61d, and as the shapes (thicknesses) of the first and second seal portions 52 and 53 are not influenced by a moving distance of the slide core 63, sealing performance in the lip part 46 is ensured, and ingress of water, foreign matters, or the like into the vehicle chamber 13 is securely prevented.

In other words, a reaction force of the first seal portion 52 can be easily changed simply by finely-adjusting a moving distance of the slide core 63, and a modification of the slide core 63 is unnecessary when changing a reaction force of the first seal portion 52, thereby saving a modification cost.

Further, the rigidity (flexibility) of the lip part 46 is different in the lip main body 51 and the first and second seal portions, and, unlike the case of providing a single flexible seal portion, sealing performance of the first and second seal portions 52 and 53 to the upper surface 14b of the front glass 14 is increased, by the elasticity of the lip main body 51 and the flexibility of the first and second seal portions 52 and 53, thereby preventing ingress of water, foreign matters, or the like.

Figure 6:
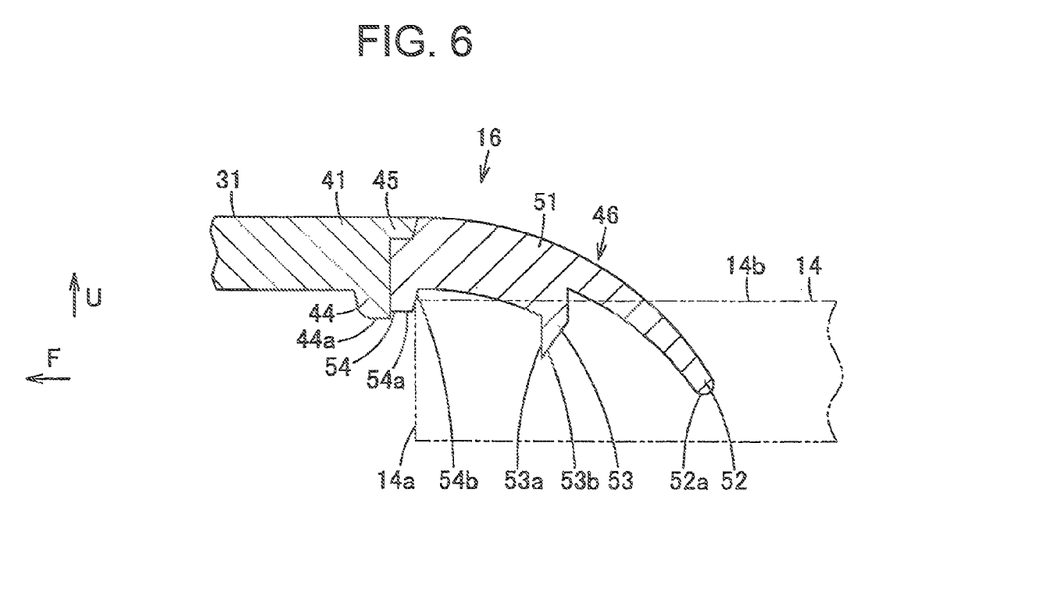
FIG. 6 is a sectional view magnifying an area close to the cowl top cover when the cowl top cover is mounted on a vehicle body.

Further, as a predetermined distance to move the slide core 63 backward in the guide hole 61d is set to make the thickness of the lip part 46 in the lip protrusion 54 smaller than the thickness of the lip part 46 in the second seal portion 53 and the thickness of the cover main body 31 in the main body protrusion 44, when mounting, the main body protrusion 44 is protected by the lip protrusion 54 softer than the main body protrusion 44, as shown in FIG. 6, the protrusion slope 54b contacts the edge 14a of the front glass 14, and the front glass 14 is prevented from being damaged by the main body protrusion 44.

Further, as the main body protrusion 44 opposite to the front glass 14 is formed so as to be protruded on the backside of the cover main body 31 at a position adjacent to the lip main body 51 of the lip part 46 having first and second seal portions 52 and 53 pressed to contact the upper surface 14b of the front glass 14, a gap is prevented between the cover main body 31 and the upper surface 14b of the front glass 14, as shown in FIG. 7. This prevents a deflection stroke toward the front glass 14 when an impact is given to the cowl top cover 16, a strong contact of, e.g., the distal end 44a of the main body protrusion 44 to the upper surface 14b of the front glass 14, and noises caused by, e.g., the main body protrusion 44a contacting the front glass 14.

In addition, the core recess 63a of the slide core 63 can form a rear protrusion 45 when the cover main body 31 is molded, and the rear protrusion 45 ensures a wide area where the cover main body 31 contacts the lip part 46.

Figure 8:
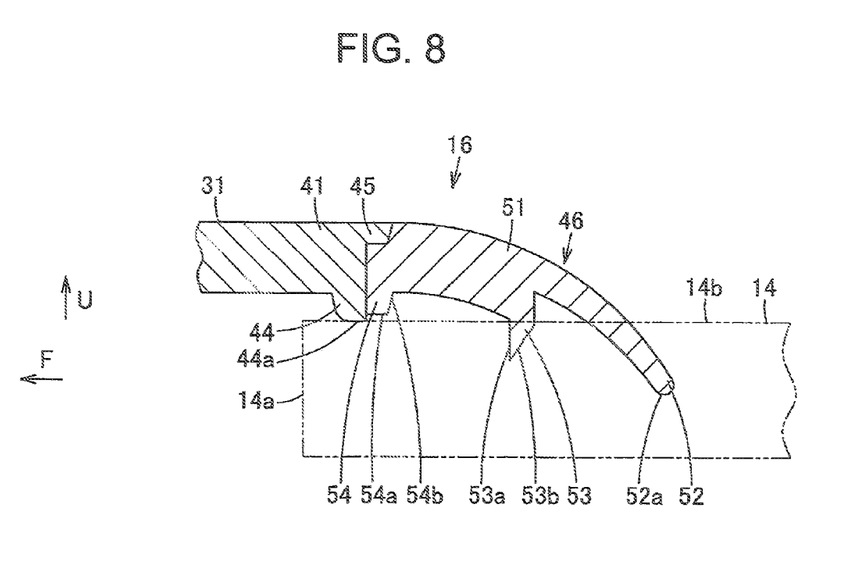
FIG. 8 is a sectional view magnifying a part of the state where a main body protrusion that is a part of the cowl top cover contacts the surface of a window shield.

In the state where the cowl top cover 16 is mounted on a vehicle, the distal end 44a of the main body protrusion 44 that is a part of the cowl top cover 16 may butt against (strongly interfere with) the front glass 14 by a mounting error, for example, as shown in FIG. 8. In this state, the distal end 44a of a part of the main body protrusion 44 contacts the upper surface 14b of the front glass 14, and the distal end 54a of the lip protrusion 54 is slightly separated from the upper surface 14b. Since a part of the main body protrusion 44 contacts the upper surface 14b of the front glass 14 when mounting the cowl top cover 16, as described above, auxiliary positioning to the front glass 14 is possible, and as the main body protrusion 44 does not contact or separate from the front glass 14 due to vibrations while an automobile is running, noises caused by contact or separation can be prevented.

Further, as the main body protrusion 44 of the cover main body 31 made of hard synthetic resin is extended toward the backside to be lower than the lip protrusion 54 of the lip part 46 made of soft synthetic resin, the distal end 44a of the main body protrusion 44 with rigidity securely contacts the front glass 14, and the cover main body 31 can be securely kept at a constant position.

Even if a temperature changes in an area to the front glass 14 as a result of a temperature change in outside air, or a variation occurs when mounting on the vehicle body 10, the main body protrusion 44 of the cover main body 31 is kept at a constant position, and the lip part 46 can be securely kept at a constant position.

Figure 9:
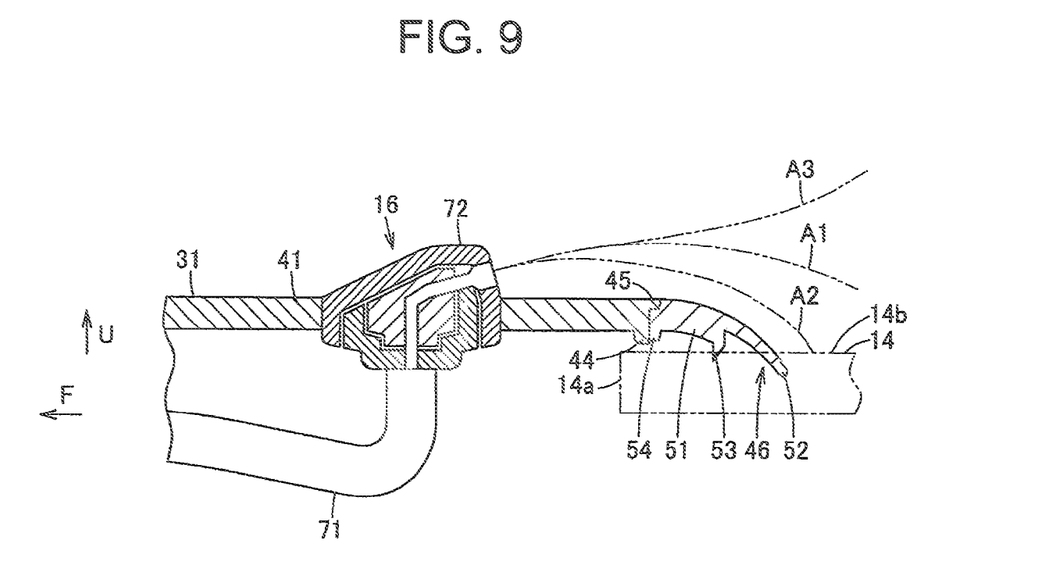
FIG. 9 is a sectional view magnifying a part of another embodiment of the cowl top cover of the present invention.

In the above embodiment, as in another embodiment shown in FIG. 9, the main body 31 of the cowl top cover 16 may be provided with a washer nozzle 72 as a nozzle connected to a not-shown washer tank retaining a cleaning liquid for cleaning the front glass 14 via a tube 71 as a long cylindrical connection member. In this configuration, even if a temperature changes as a result of a temperature change in outside air, or a variation occurs when mounting on the vehicle body 10, the cowl top cover 16 can be kept at a constant position with respect to the front glass 14 by means of the main body protrusion 44. Thus, a mounting angle of the cowl top cover 16 can be stabilized, an angle (a direction) of ejecting a cleaning liquid from the washer nozzle 72 to the upper surface 14b of the front glass 14 can be kept optimum (a virtual line A1), and undesirable ejection angles (virtual lines A2/A3) can be prevented.

In each embodiment described hereinbefore, if synthetic resin with good adhesion property is appropriately selected for the cover main boy 31 and lip part 46, a rear part of the cover main body 31 may be plane without formation of a rear protrusion 45.

INDUSTRIAL APPLICABILITY

The present invention is applicable to a cowl top cover that is placed adjacent to an engine room of an automobile, for example.

What is claimed is:
1. A cowl top cover made of synthetic resin, comprising:
  a cover main body which covers a cowl between a window shield and a vehicle body member; and
  a lip part which is adjacent to the cover main body and is softer than the cover main body, wherein
  the lip part includes:
  a lip main body whose proximal end is adjacent to the cover main body;
  a first seal portion which is formed so as to be protruded at a distal end of the lip main body, and is pressed to contact the window shield; and
  a second seal portion which is formed so as to be protruded to the window shield at a proximal end of the first seal portion, and is pressed to contact the window shield, and
  the cover main body has a main body protrusion which is formed so as to be protruded to a backside at a position adjacent to the lip main body, and is opposed to the window shield.
2. The cowl top cover according to claim 1, wherein
  the lip part has a lip protrusion which is formed so as to be protruded to the backside in an area adjacent to the main body protrusion of the lip main body, and is opposed to the window shield, and
  the main body protrusion is extended to the backside to be lower than the lip protrusion.
3. The cowl top cover according to claim 2, wherein
  a rear side of the lip protrusion has a protrusion slope inclined rearward and upward across entire length of the lip main body.

4. The cowl top cover according to claim 1, wherein
on the upper side of the main body protrusion formed to the cover main body, a rear protrusion is formed so as to be protruded toward the rear side of the cover main body.

* * * * *